US007131455B2

(12) United States Patent
Horban et al.

(10) Patent No.: US 7,131,455 B2
(45) Date of Patent: Nov. 7, 2006

(54) TANK CAR MANWAY COVER

(75) Inventors: Blaise A. Horban, Chesterton, IN (US); Carl L. Carney, Homewood, IL (US); Alan N. Henzi, Mt. Prospect, IL (US)

(73) Assignee: Union Tank Car Company, East Chicago, IN (US)

( * ) Notice: Subject to any disclaimer, the term of this patent is extended or adjusted under 35 U.S.C. 154(b) by 0 days.

(21) Appl. No.: 11/044,895

(22) Filed: Jan. 27, 2005

(65) Prior Publication Data

US 2006/0162786 A1 Jul. 27, 2006

(51) Int. Cl.
*A01M 7/00* (2006.01)

(52) U.S. Cl. ........................ 137/350; 105/358; 220/830

(58) Field of Classification Search ................ 137/350; 105/358; 220/830
See application file for complete search history.

(56) References Cited

U.S. PATENT DOCUMENTS

| | | | | |
|---|---|---|---|---|
| 1,165,736 A | | 12/1915 | White | |
| 1,487,518 A | | 3/1924 | Nichols et al. | |
| 1,603,277 A | | 10/1926 | Gilpin | |
| 1,606,524 A | | 11/1926 | Gilpin | |
| 1,665,608 A | * | 4/1928 | Schnneidier et al. | 220/623 |
| 1,786,747 A | | 12/1930 | Gilpin | |
| 1,896,367 A | | 2/1933 | Mussey et al. | |
| 1,896,616 A | | 2/1933 | Gillican | |
| 3,212,824 A | | 10/1965 | Emery et al. | |
| 3,786,955 A | * | 1/1974 | Mowatt-Larssen | 220/327 |
| 6,076,471 A | | 6/2000 | Burian et al. | |
| 6,595,716 B1 | | 7/2003 | VanDeVyvere et al. | |

* cited by examiner

*Primary Examiner*—A. Michael Chambers
(74) *Attorney, Agent, or Firm*—Wood, Phillips, Katz, Clark & Mortimer

(57) ABSTRACT

A manway cover assembly for a railroad tank car. The manway cover assembly is moveable between a closed position in covering relationship with a manway nozzle and an open position that permits access into the tank car. The manway cover assembly includes a manway cover having a generally inwardly convex central portion and a generally flat outer annular portion having an inwardly facing recess formed therein for receipt of an upper edge of the manway nozzle. A generally flat round weather shield member is attached to the outer ring member in covering relationships with the central inwardly convex portion of the manway cover member.

10 Claims, 3 Drawing Sheets

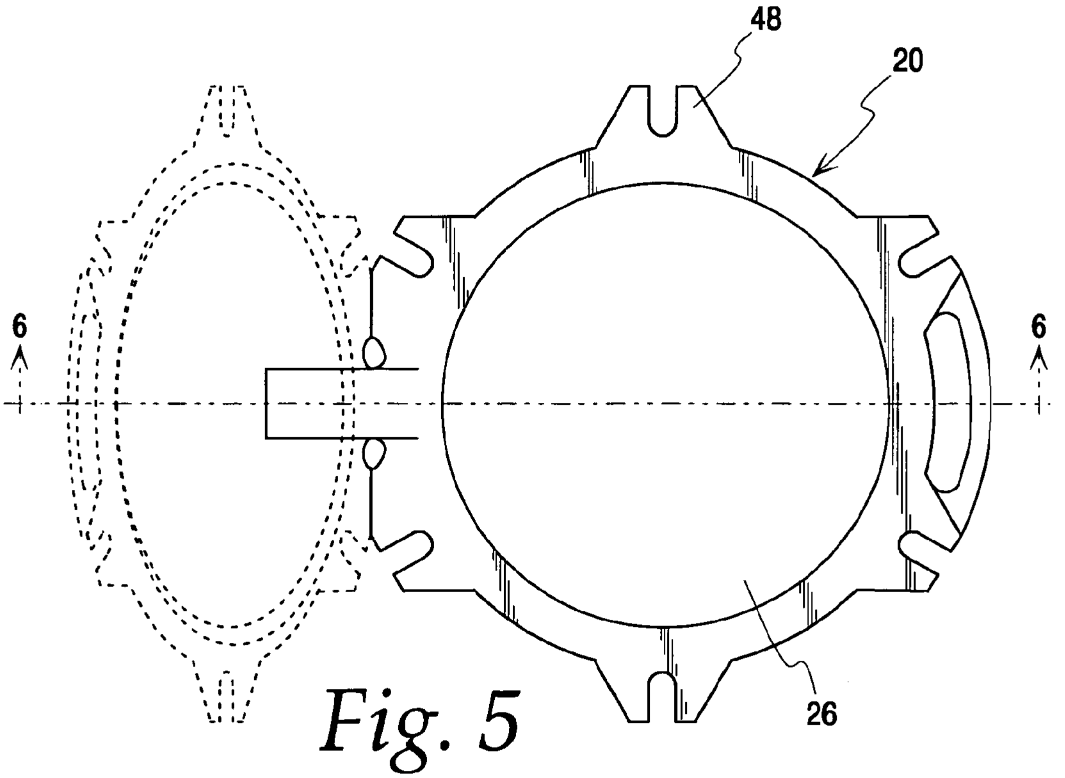
*Fig. 5*
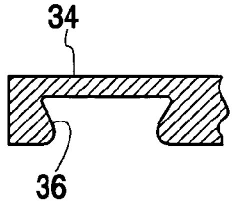
*Fig. 7*
*Fig. 6*
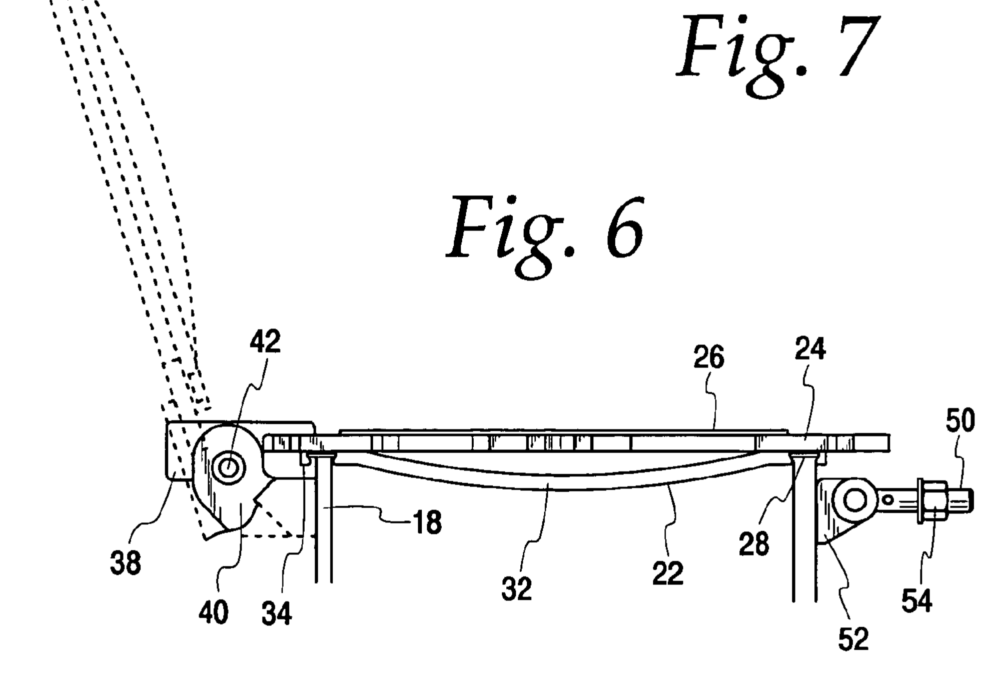

TANK CAR MANWAY COVER

BACKGROUND OF THE INVENTION

The present invention relates generally to railroad tank cars and more specifically to manway covers for railway cars.

Railroad tanks are used to transport a wide variety of different types of commodities. Tank cars must be designed to accommodate a variety of commodities that create high internal pressure within the tank.

Railroad tank cars typically have one or more manway access openings on their top surface which allow workers to climb into the tank car to inspect, repair or clean the interior thereof. The manways typically comprise a cylindrical tube that communicates with an access opening in the tank and a manway cover assembly that is positioned in sealing relationship to the manway nozzle.

Manway covers have heretofore typically been flat or outwardly convex in shape and have been provided with sealing gaskets to maintain the pressure within the tank when the cover is in its closed position. Examples of such manway covers are disclosed in U.S. Pat. No. 6,076,471.

However, such flat or outwardly convex manway covers are susceptible to failure at high internal pressures (i.e. psi), particularly when the manway cover is made of stainless steel.

Accordingly, there is a need for a manway cover design that can accommodate higher internal tank pressures whether made from either carbon steel or stainless steel or a combination thereof.

SUMMARY OF THE INVENTION

A manway cover assembly is provided for a railroad tank car that is moveable between a closed position, in covering relationship with the manway nozzle that communicates with the manway access opening, and an open position, that permits entry into the manway nozzle. The open position of the cover also facilitates bulk loading of certain non-hazardous or low level hazardous commodities. In accordance, with one aspect of the invention, the manway cover assembly includes a manway cover member that has a generally inwardly convex central portion that extends into the manway nozzle.

In accordance with a further aspect of the invention, the manway cover member may a have a generally flat annular portion, having an inwardly facing recess formed therein, for receipt of an upper portion of the manway nozzle. A sealing gasket may be positioned in the recess.

In accordance with a further aspect of the invention, an outer ring member may be secured to the outer surface of the generally flat annular portion of the cover member. The outer ring member may be provided with openings formed therein for receipt of the locking lugs when the manway cover is in its closed portion.

In accordance with another aspect of the invention, a generally flat weather shield member may be attached to the outer ring in covering relationship with the central inwardly convex portion of the manway cover member.

BRIEF DESCRIPTION OF THE DRAWINGS

FIG. 5 is a top plan view of the cover member showing it in its closed position in solid lines and in its open position in dotted lines;

FIG. 6 is an elevational view of the manway cover assembly; and

FIG. 7 is a sectional view of the gasket receiving recess portion.

DETAILED DESCRIPTION OF THE INVENTION

Figure 1:
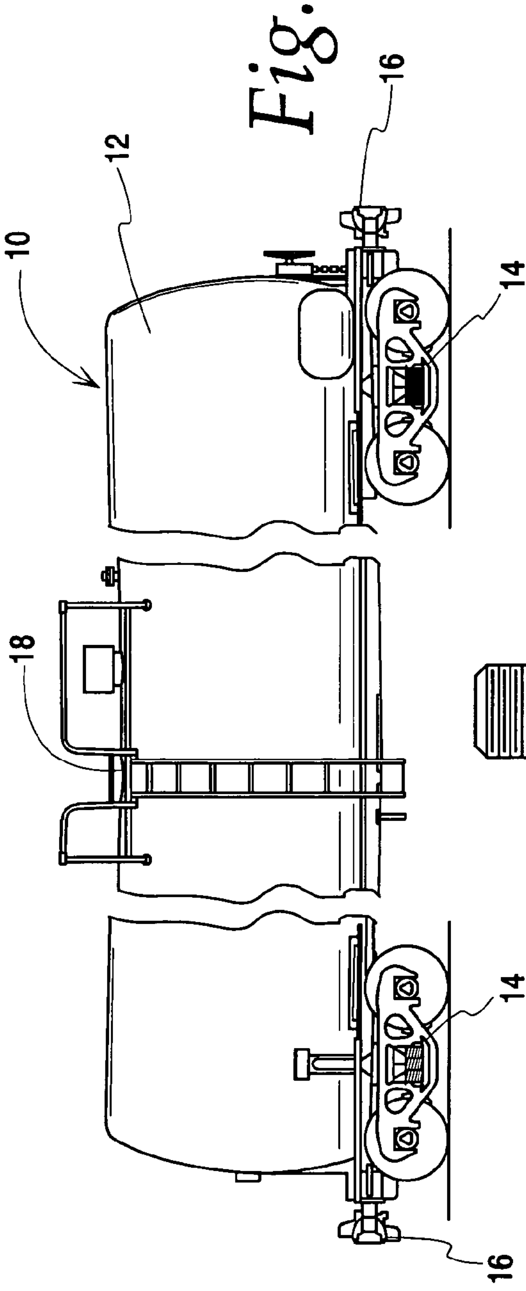
FIG. 1 is a schematic side elevational view of a railroad tank car of the type which has a manway access opening incorporating a manway cover assembly in accordance with the invention.
Figure 4:
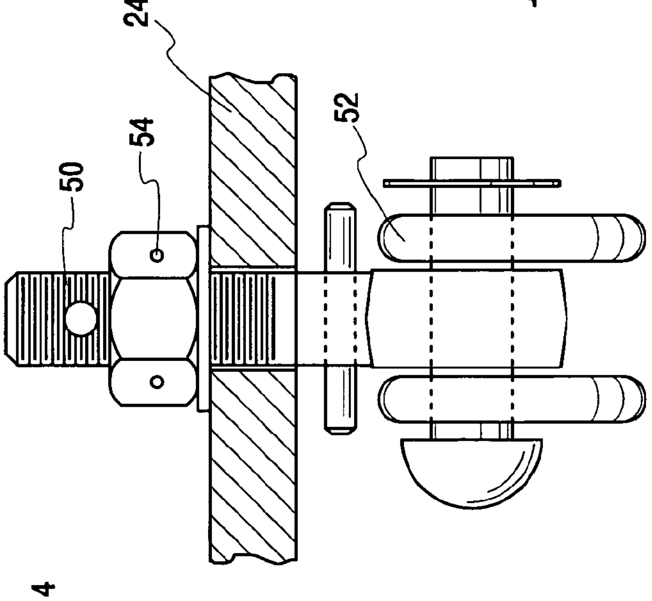
FIG. 4 is a enlarged sectional view taken along line 4—4 in FIG. 2.
Figure 2:
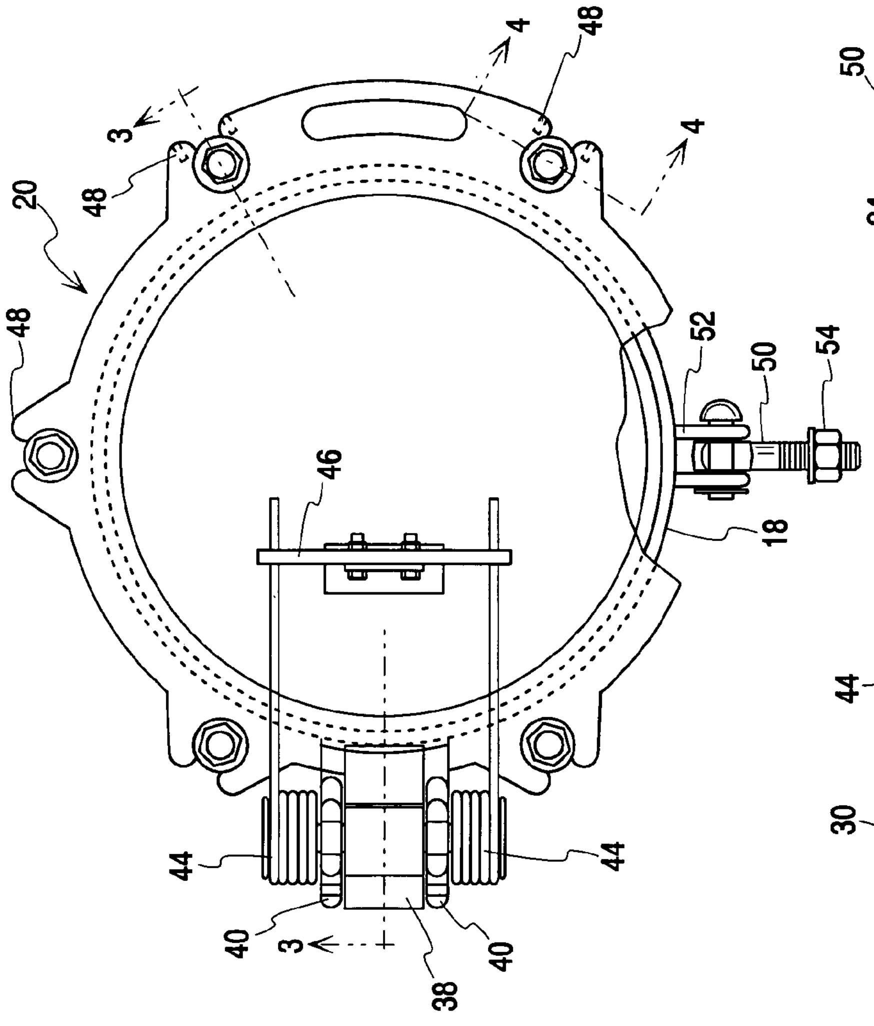
FIG. 2 is a top plan view, partially broken away, of a manway cover assembly in accordance with the invention.
Figure 3:
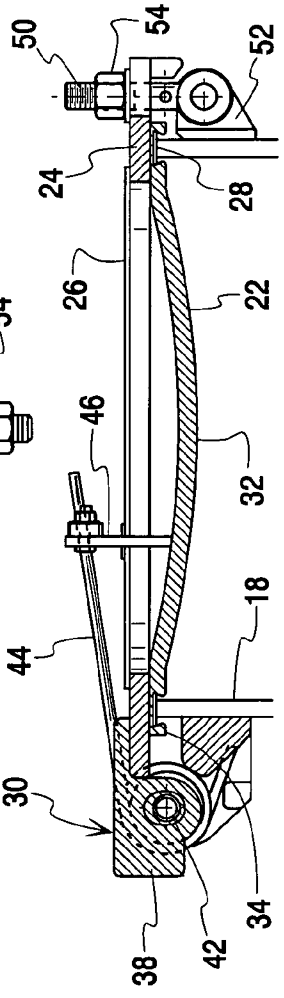
FIG. 3 is a sectional view taken along line 3—3 in FIG. 2.

Referring to FIG. 1, there is shown a typical railroad tank car 10, of the type for which the present invention is intended for use. Tank car 10 includes a tank body or shell 12 that is supported on wheel truck assemblies 14. Couplers 16 are provided at both ends of the car. Tank car 10 has an access manway nozzle 18 that communicates with the interior of the tank body 12.

Referring to FIGS. 2–6, in accordance with the present, a manway cover assembly 20 is provided that is moveable between a closed position in covering relationship with the manway nozzle 18, and an open position that permits access into the manway nozzle.

Manway cover assembly 20 includes a manway cover member 22, an outer ring member 24, a weather shield member 26, a sealing gasket 28, and a spring biased mounting bracket assembly 30.

Manway cover member 22 has a generally inwardly convex central portion 32 that extends into the manway nozzle when the cover member is in the closed position. It has been determined that the inwardly convex shape of the cover member minimizes the cumulative effects of bending and membrane stresses to contain an internal pressure of the commodity up to about 165 psi. The manway cover member 22 includes a generally flat annular outer portion 34. Referring to FIG. 7, outer portion 34 has an inwardly facing annular recess 36 formed therein for receipt of the upper edge of the manway nozzle when the manway cover assembly is in its closed position. A suitable gasket member 28 is positioned in recess 36 to seal against the upper edge of the manway nozzle.

A generally flat weather shield member 26 is suitably attached to the outer ring member 24 of the manway cover assembly 20.

The manway cover assembly 20 is pivotally attached to the manway nozzle 18 in a conventional manner. A bracket member 38, having a horizontal opening formed therein, is attached to the outer ring member 24 and a pair of cooperating spaced apart bracket members 40, having horizontal openings formed therein, are attached to the manway nozzle 18. A pivot pin 42 extends through the openings formed in the bracket members 38 and 40. In order to facilitate the lifting of the cover assembly 20, a conventional biasing spring mechanism is provided that includes spring members 44 that are received about the pivot pin 42. The respective ends of the springs are suitably attached to the brackets 40 and an upstanding bracket member 46 that is attached to the cover member 22.

The outer ring member 24 is formed with a plurality of spaced apart open slots 48 formed for receipt of pivotal locking bolts 50 to secure the cover member 22 in its closed position. One end of the bolts 50 is pivotally mounted to a bracket member 52 that is attached to manway nozzle 18 and the other end receives a locking nut 54 to clamp the manway cover assembly 20 into sealing engagement with the upper edge of the manway nozzle 18.

In accordance with the present invention, it is presently envisioned that the manway cover member 22 and the outer ring member 24 may both be made of carbon steel or stainless steel. It is also envisioned that the manway cover member 22 may be made of stainless steel and the outer ring member 24 may be made of carbon steel.

Although certain preferred embodiments have been described above, it will be appreciated by those skilled in the art to which the present invention pertains that modifications, changes, and improvements may be made without departing from the spirit of the invention defined by the claims. All such modifications, changes and improvements are intended to come within the scope of the present invention.

What is claimed is:

1. In combination with a railroad tank that includes a tank body having an internal pressure above atmospheric pressure and a manway nozzle that communicates with a manway access opening in an upper portion thereof, a manway cover assembly moveable between a closed position in covering relationship with the manway nozzle and an open position permitted access into the manway nozzle; said manway cover assembly comprising:

- a manway cover member pivotally attached to the manway nozzle for movement between a closed and open position, said manway cover member including a generally inwardly convex central portion that extends into the manway nozzle and including an inwardly facing recess adapted to receive an upper edge of the manway nozzle when said cover member is in said closed position.

2. The manway cover assembly of claim 1, wherein a sealing gasket is positioned in the recess.

3. The manway cover assembly of claim 1, wherein an outer ring member is attached to an outer surface of a, generally flat annular portion of said manway cover member, and said outer ring member has a plurality of open portions spaced around said outer ring member for receipt therein of locking bolts when the manway cover is in its closed position.

4. The manway cover assembly of claim 3, wherein a generally flat round weather shield member is attached to the outer ring member in covering relationships with the central inwardly convex portion of the manway cover member.

5. The manway cover assembly of claim 4, wherein the outer ring member has a first bracket member attached thereto which is pivotally connected to a second bracket member that is attached to the manway nozzle.

6. The manway cover assembly of claim 5, further including a spring member which biases the cover member towards its open position.

7. The invention of claim 1, wherein said inwardly facing recess comprises an annular groove having a radial width tapering outwardly whereby the inwardly facing opening to said groove is narrower than the bottom of said groove.

8. In combination with a railroad tank that includes a tank body having an internal pressure above atmospheric pressure and a manway nozzle that communicates with a manway access opening in an upper portion thereof, a manway cover assembly moveable between a closed position in covering relationship with the manway nozzle and an open position permitted access into the manway nozzle; said manway cover assembly comprising:

- a manway cover member pivotally attached to the manway nozzle for movement between a closed and open position, said manway cover member including
  - a generally inwardly convex central portion that extends into the manway nozzle, and
  - an inwardly facing recess adapted to receive an upper edge of the manway nozzle when said cover member is in said closed position;
- a sealing gasket positioned in the recess;
- an outer ring member attached to an outer surface of a generally flat annular portion of said cover member, said outer ring member having a plurality of open portions spaced around said outer ring member for receipt therein of locking bolts when the manway cover is in its closed position.

9. The manway cover assembly of claim 8, wherein a generally flat round weather shield member is attached to the outer ring member in covering relationship with the central inwardly convex portion of the manway cover member.

10. The manway cover assembly of claim 8, wherein the pivotal attachment of the manway cover to the manway nozzle includes:

- a first bracket member attached to the outer ring member and pivotally connected to a second bracket member attached to the manway nozzle; and
- a spring member which biases the cover member towards its open position.

* * * * *